J. C. Plumer,
Shoe Last,
No. 45,748. Patented Jan. 3, 1865.
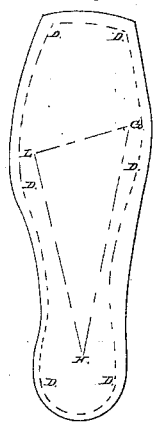
Fig. 1.
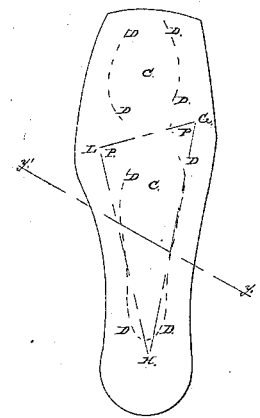
Fig. 2.
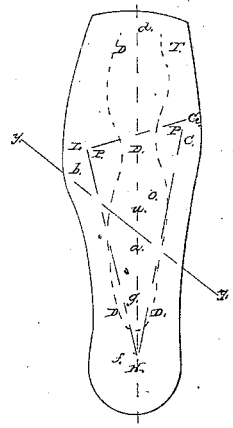
Fig. 3.
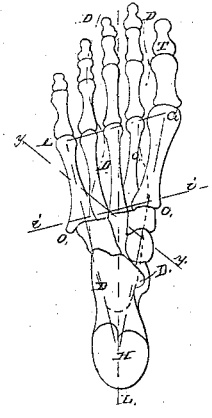
Fig. 4.
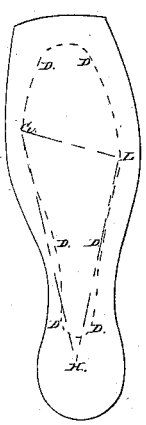
Fig. 5.
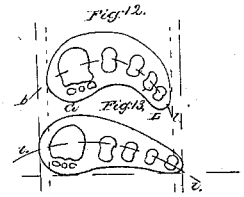
Fig. 12.
Fig. 13.
Fig. 6.
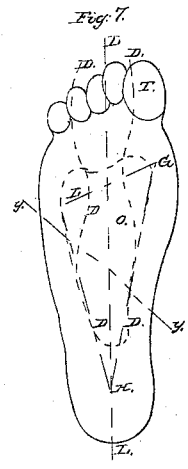
Fig. 7.
Fig. 17.
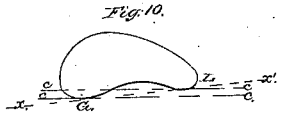
Fig. 10.
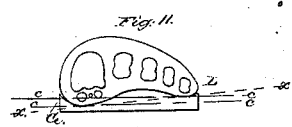
Fig. 11.
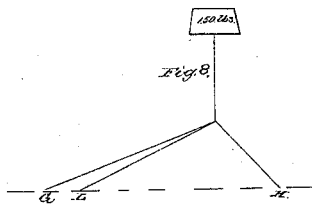
Fig. 8.
Fig. 9.
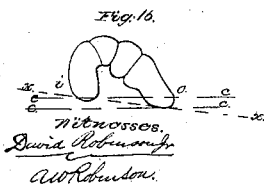
Fig. 16.
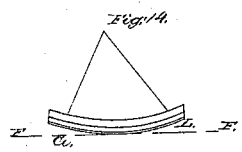
Fig. 14.
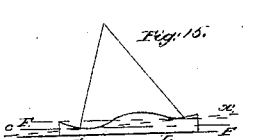
Fig. 15.
Witnesses.
David Robinson Jr.
A. W. Robinson.
Inventor:
John C. Plumer.

UNITED STATES PATENT OFFICE.

JOHN C. PLUMER, M. D., OF PORTLAND, MAINE.

IMPROVED BOOT AND SHOE LAST.

Specification forming part of Letters Patent No. 45,748, dated January 3, 1865.

*To all whom it may concern:*

Be it known that I, JOHN C. PLUMER, of Portland, in the county of Cumberland, State of Maine, have invented certain Improvements in Shoe-Makers' Lasts; and I do hereby declare that the following is a full and exact description thereof, reference being had to the accompanying drawings, and to the letters of reference marked thereon, making a part of my specification, in which—

Figure 1 represents the sole of a common last transversely convex throughout. Fig. 2 represents Fig. 1 made flat across the ball portion, with a general transverse inclination downward and inward from G to L, and downward and outward from Y to Y' when the plane of the heel portion is horizontal. Fig. 2 is also concave in front and behind the line G L at C C. Fig. 3 represents Fig. 2, with the addition of the prominences G L T. Fig. 4 represents the skeleton or bony structure of the sole of the human foot—H, the heel; G L, the joints of the great and little toes. Fig. 5 represents the upper or treading surface of the sole of an ordinary shoe transversely concave throughout formed on a convex last, such as represented by Fig. 1. Fig. 6 represents the upper or treading surface of a boot or shoe sole transversely concave at H G L T and convex between G and L, formed on the improved last, Fig. 3. Fig. 7 represents the fleshy form of the sole of the human foot, showing its natural transverse inclinations of surface, its protuberances and transverse concavity. Fig. 8 represents a tripod resembling that formed by the junction of the longitudinal and transverse arches of the human foot, each portion or foot of which rests upon the same horizontal plane. Fig. 9 represents the same as Fig. 8, with the exception of each foot of the tripod resting on a different plane. Fig. 10 represents a vertical transverse section of Fig. 7 at G L, showing the transverse inclination of surface $x'$ $x$ downward and inward from L to G, the lines C C showing the different planes of G and L. Fig. 11 represents a vertical transverse section of Fig. 7 within a shoe made on my improved last, the lines $x'$ $x$ showing the transverse general inclination of the upper surface of the sole downward and inward from the joint of the little toe to that of the great toe, and the lines C C showing their different planes. Fig. 12 represents a vertical transverse section of the human foot at the ball portion thereof, (G L, Fig. 7,) subjected to lateral compression by the upper leather of the sole, by means of which the feet G L of the tripod, Fig. 8, are approximated, assuming a different relation to each other and to the foot H of the tripod. Fig. 13 represents the same as Fig. 12, unrestrained by lateral compression. Fig. 14 represents a transverse section of a common boot-sole supporting the feet G L of the tripod, Fig. 8. Fig. 15 represents a corresponding section of a sole made on my improved last, supporting the feet G L of the tripod Fig. 8. Fig. 16 represents a vertical transverse section of the bony structure of the human foot at the instep portion thereof at the line $i$ $i$, Fig. 4, the line $x$ $x$ showing the general inclination of surface to be downward and outward from $i$ to $o$, the lines C C showing the different planes of each portion. Fig. 17 represents the longitudinal outline of my improved last compared with that of the old, showing the shortening of the shank from $z$ to $x$.

The object of my invention is to produce a last on which a boot or shoe can be made which shall at once, without the tedious process of "breaking in," conform and coapt itself to the contour of the solid structure of the bottom or sole of the natural human foot, so that the use of the boot or shoe shall tend to preserve its natural form rather than to distort it.

In a previous patent, dated the 17th of July, 1860, I described certain improvements designed to attain in an imperfect degree the same object; but the portion of the invention therein described relating to the sole or under surface of the last was limited to changing a part of the general transverse convexity thereof to a general transverse concavity without particular reference to the form or location of the concavity or the resulting convexities or protuberances on either side of the concavity.

The invention which constitutes the subject-matter of this application has for its object the form and relative position of the concavity and protuberances, and has particular reference to the conformation of the sole of the last, Fig. 3, and its object is to produce upon the upper surface of the sole of the intended boot or shoe, Fig. 6, certain general inclinations of surface which shall have a general coaptation to the sole of the foot, certain elevations of surface for the support of particular portions thereof, and certain depressions or bearing-points particularly formed and located for the reception and adjustment of its three natural protuberances, H, G, L, Fig. 7, by means of which it is restrained from gliding forward or to either side and rests with ease and security.

It is to be borne in mind that the condition of the foot within a shoe, the sole of which, as we are accustomed to wear them, is always narrower than the outspread foot, is very different from that in which it is natural and unconstrained by compression. The pressure of the upper leather against the outer and inner margins of the foot, immediately on its being thrust within the shoe, prevents lateral expansion, so that the span of the transverse arch $l\ l$, Fig. 13, is shortened, and the width of the foot, through compression of its interosseus tissues, practically diminished. At the same time, as a natural result, the protuberances G L, Fig. 12, are rendered more prominent, and the depression between them is thereby increased in depth.

For ease and evenness of tread and the comparative unrestrained movements of the different members of the foot in this artificial condition, it is important that the general transverse inclination of the upper or treading surface of the boot or shoe sole, at that portion corresponding with and immediately behind the ball portion of the foot G L, Fig. 7, should, when compared with the plane of the heel portion thereof, be diagonally downward and inward from L to G, Fig. 6, and $x'$ to $x$, Fig. 11, so as to accommodate itself to the same inclination of this portion of the foot, while farther back, beneath the instep, at $x\ x$, Fig. 16, and $i\ i$, Fig. 4, the transverse inclination should be downward and outward with reference to the plane of the heel portion, so as to accommodate itself to the natural inclination of that portion of the foot Y to Y, Figs. 4 and 7, between the heel and ball portion; and, further, in addition to these opposite inclinations, it is important that there should be made upon the upper surface of the sole four distinct and well-defined depressions, H G L T, Fig. 6, corresponding with and for the reception and adjustment of the corresponding protuberances, Figs. 4 and 7, and that of these depressions H should be located on the median line L' L' of the back part of the sole, while G and L are located on either side of the median line and diagonally with reference to it, G being farther forward from H, and larger and deeper than L.

The union of the longitudinal and transverse arches of the human foot form an elastic and adjustable tripod, Fig. 8, with legs of unequal length and feet of different size and form, G L H, Figs. 4 and 8, upon which the superimposed weight of the body is supported. In condition of nature, with the organism of the foot unrestrained by covering, this elastic tripod will accommodate itself to all the variable forms of natural surfaces, will alike coapt itself to depressions, as in the earth, grasp the convex surface of the rail or "tight rope," but rest with most security upon a flat surface with each foot of the tripod on the same horizontal plane. In civilized customs all these conditions are changed. The heel portion H of the tripod is supported upon a plane above that of the others, C L, Fig. 9, which commonly rest on the margin of a guttering or transversely concave sole, Fig. 14.

From experience and observation it appears that whatever the original form of the ball portion of the sole of the shoe, Fig. 14, that by use it will become transversly flat on its under surface, transversely concavo-convex on its upper, with a general inclination of plane diagonally downwards and inwards, and, moreover, it will become worn thinner beneath the foot G of the tripod, Fig. 15, the joint of the great toe, than beneath L, that of the little toe. Upon this conformation of the upper surface of the sole, produced by the foot in asserting its requirements, each separate portion or foot of the tripod will rest in a different horizontal plane, H being the highest, G the lowest, and L between them, Figs. 9, 11, and 15. Regarding this as an indication of the acquired habits of the foot under the restraint of civilization, of the position in which it should be supported, and especially of the conformation which should be originally imparted to the sole, it is apparent that it can only be done by the use of a properly-formed last, upon which it is molded. And so it is when the foot is supported on a sole fashioned on my improved last. A transverse section of such a sole supporting the feet G L of the tripod is represented in Fig. 15, G being on a plane below that of L, while both are on a plane below H, Fig. 9.

In order to make a boot or shoe sole of leather or like material with the characteristics above described, it is requisite to use a last with an under surface having the general local inclination downward and inward, L to G, Fig. 2, and $x'$ to $x$, Fig. 10, and downward and outward, Y' to Y, Figs. 6 and 16, with the addition of suitable prominences, G L, Fig. 3, to produce the desired depressions. By the addition to Fig. 2 of the elleptical prominences G L such a last will be formed, Fig. 3, prominence G being larger, fuller, and more protuberant than L, so as to produce a deeper depression on the sole of the shoe, and its comparative fullness extended farther back into the shank of the last and the protuberances situated diagonally with reference to the medium line L' L', Fig. 3. The entire resulting concave will then be of an elliptical form, constricted about its middle and defined by the line D D D D, Fig. 3.

The conformation of the sole of my improved last may be more particularly described by dividing it into three separate parts or sections, as follows:

The first part relating to the form of that portion corresponding with the feet G L of the tripod, Figs. 2, 3, and 10, and the intervening space between them embracing the ball portion, in which a last of the old style is made transversely flat, Fig. 2, with the surface inclining downward and inward when compared with the plane of the heel portion, which is done by cutting away more from the outside than from the inside of the last. This being done, the prominences G L are added, Fig. 3, formed and located as above specified.

The second part relating to the form of the triangular space comprised between the three feet of the tripod and embracing the shank portion between the line G L and the front of the heel portion H, which is made to incline downward and outward by cutting away more from the inside than from the outside. This being done, this portion of the last is made transversely concave.

The third part or the toe portion embraces all in front of the line G L which is made transversely concave, and then has the protuberance T added.

What I claim as my invention, and desire to secure by Letters Patent, is—

1. In the construction of a shoe-last, the transverse inclined planes L G and Y Y, as described, in combination with the prominences G L, as described.

2. The form and location of the prominences G L, as described.

3. The form and location of the concavity D D D D, as described.

4. The combination of the planes, concavities, and prominences, as described.

JOHN C. PLUMER.

Witnesses:
DAVID ROBINSON, Jr.,
A. W. ROBINSON.